US 6,560,194 B1

(12) United States Patent
Gourgue et al.

(10) Patent No.: US 6,560,194 B1
(45) Date of Patent: May 6, 2003

(54) METHOD OF ALLOCATING ORTHOGONAL CODES IN A CODE DIVISION MULTIPLE ACCESS MOBILE RADIO SYSTEM USING CODES OF VARIABLE LENGTH

(75) Inventors: Frédéric Gourgue, Paris (FR); Fabienne Roosen, Bourg la Reine (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/287,289

(22) Filed: Apr. 7, 1999

(30) Foreign Application Priority Data

Oct. 12, 1998 (FR) .............................. 98 12752

(51) Int. Cl.[7] .............................................. H04J 11/00
(52) U.S. Cl. ........................................ 370/203; 375/130
(58) Field of Search ................................ 370/203, 209; 375/130

(56) References Cited

U.S. PATENT DOCUMENTS

| | | | | |
|---|---|---|---|---|
| 5,357,454 A | * | 10/1994 | Dent ........................... | 708/410 |
| 5,583,851 A | * | 12/1996 | Kato et al. ................... | 370/342 |
| 5,751,761 A | | 5/1998 | Gilhousen | |
| 6,084,884 A | * | 7/2000 | Adachi ........................ | 370/203 |
| 6,091,760 A | * | 7/2000 | Giallorenzi et al. .......... | 370/208 |
| 6,108,369 A | * | 8/2000 | Ovesjo et al. ............... | 375/146 |
| 6,130,884 A | * | 10/2000 | Sato ............................ | 370/335 |
| 6,163,524 A | * | 12/2000 | Magnusson et al. ......... | 370/208 |
| 6,339,646 B1 | * | 1/2002 | Dahlman et al. ............ | 380/273 |
| 6,353,638 B1 | * | 3/2002 | Hottinen et al. ............. | 375/260 |
| 6,424,618 B1 | * | 7/2002 | Uesugi et al. ............... | 370/208 |
| 6,466,559 B1 | * | 10/2002 | Johansson et al. .......... | 370/335 |
| 2002/0097702 A1 | * | 7/2002 | Take ........................... | 370/342 |

FOREIGN PATENT DOCUMENTS

| | | | | |
|---|---|---|---|---|
| EP | 0 814 581 A2 | | 12/1997 | |
| EP | 000878930 A1 | * | 11/1998 | ............ H04J/13/00 |

OTHER PUBLICATIONS

F. Adachi, M. Sawahashi and K. Okawa. "Tree–structure generation of orthogonal spread codes with different lengths for forward link of DS–CDMA mobile radio". Electronic Letters. vol. 22, Issue 1. pp. 27–28. Jan. 2, 1997.*

Okawa K., et al.: " Orthogonal Multi–spreading Factor Link for Coherent DS–CDMA Mobile Radio" 1997 IEEE 6th International Confernece on Universal Personal Communications Record, San Diego, Oct. 12–16, 1997, pp. 618–622, XP000777896 Institute of Electrical and Electronics Engineers.

* cited by examiner

*Primary Examiner*—Melvin Marcelo
*Assistant Examiner*—Derrick W Ferris
(74) *Attorney, Agent, or Firm*—Sughrue Mion, PLLC

(57) ABSTRACT

Method of allocating orthogonal codes in a code division multiple access mobile radio system using codes of variable length which are generated in such a way that they can be represented in the form of a tree, said method including, in response to a code allocation request, a first step of determining, in accordance with the tree capacity used, corresponding to codes already allocated, and the tree capacity required, corresponding to the code allocation requested, if such allocation is possible.

12 Claims, 6 Drawing Sheets

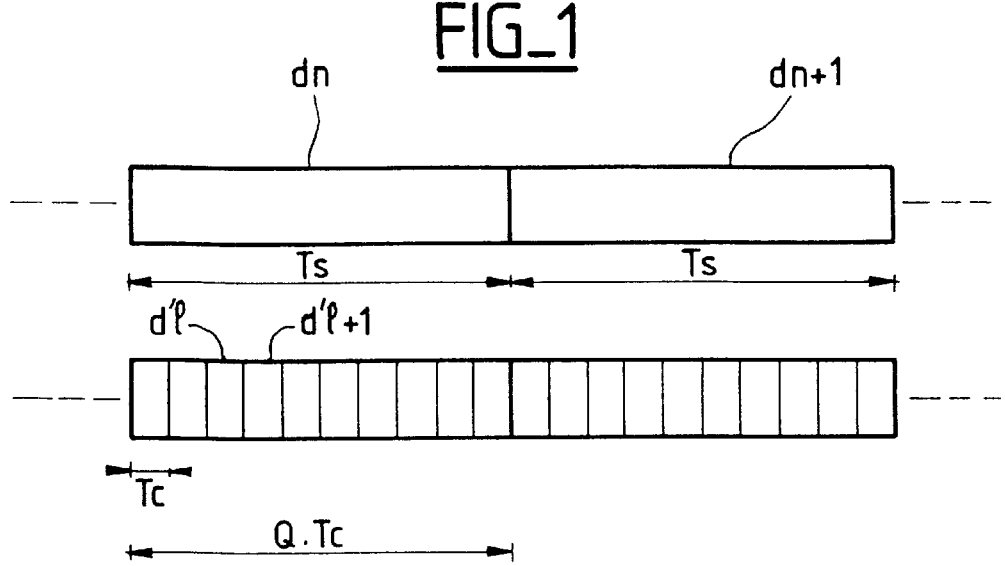
FIG_1
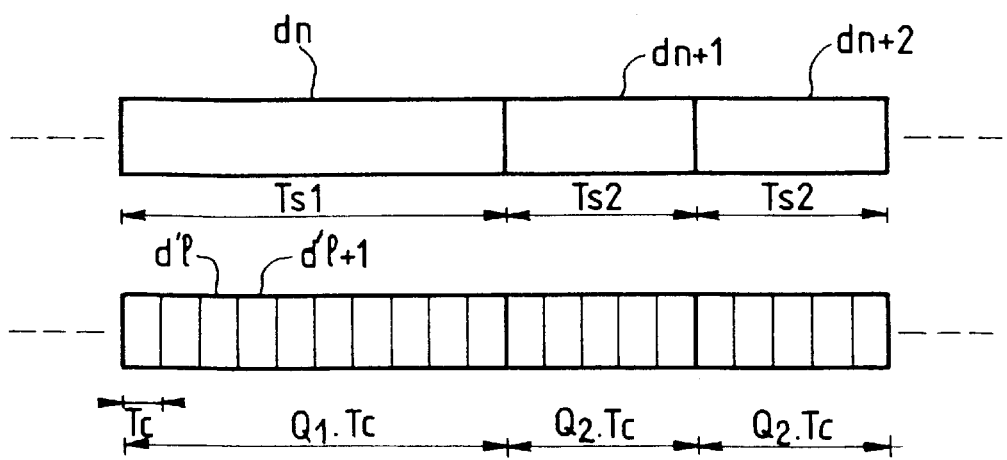
FIG_2

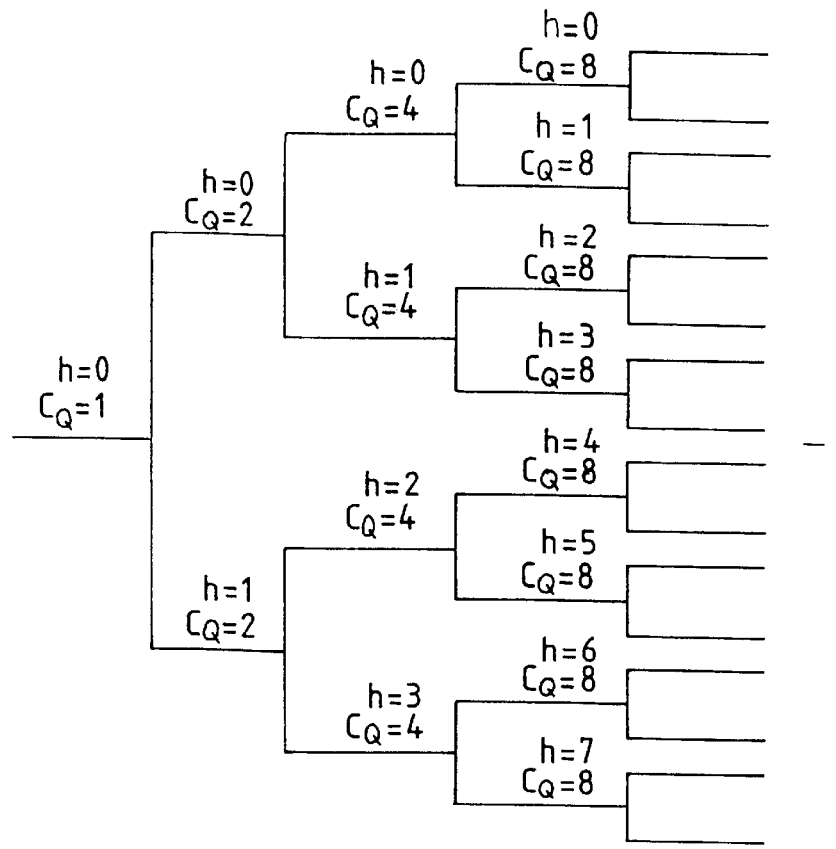
FIG_3
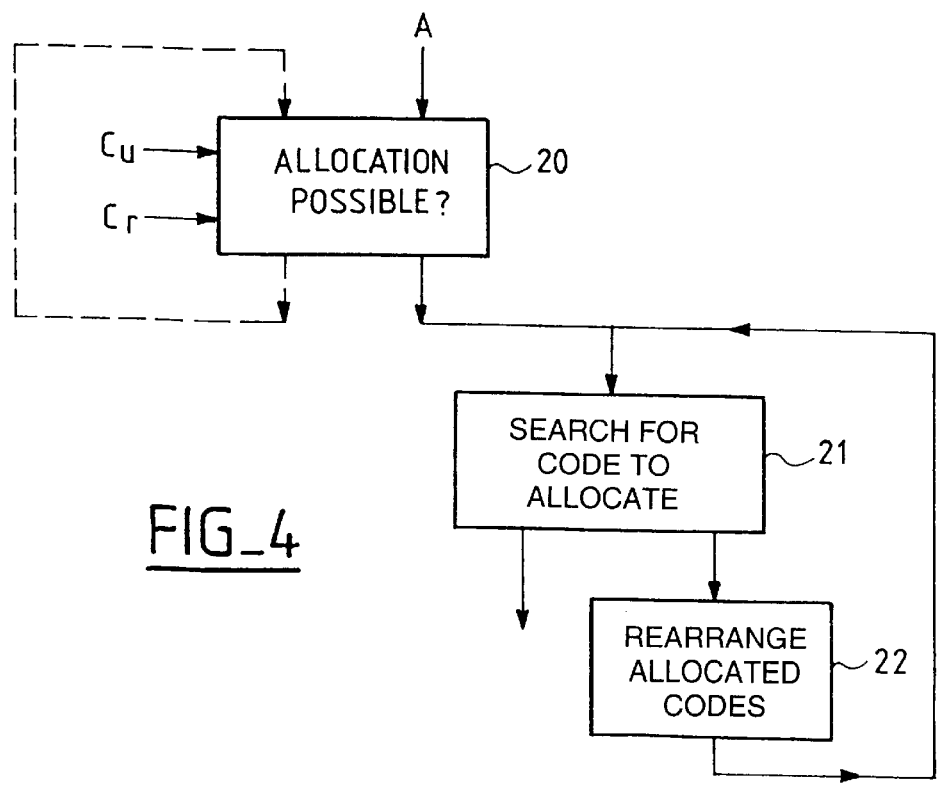
FIG_4

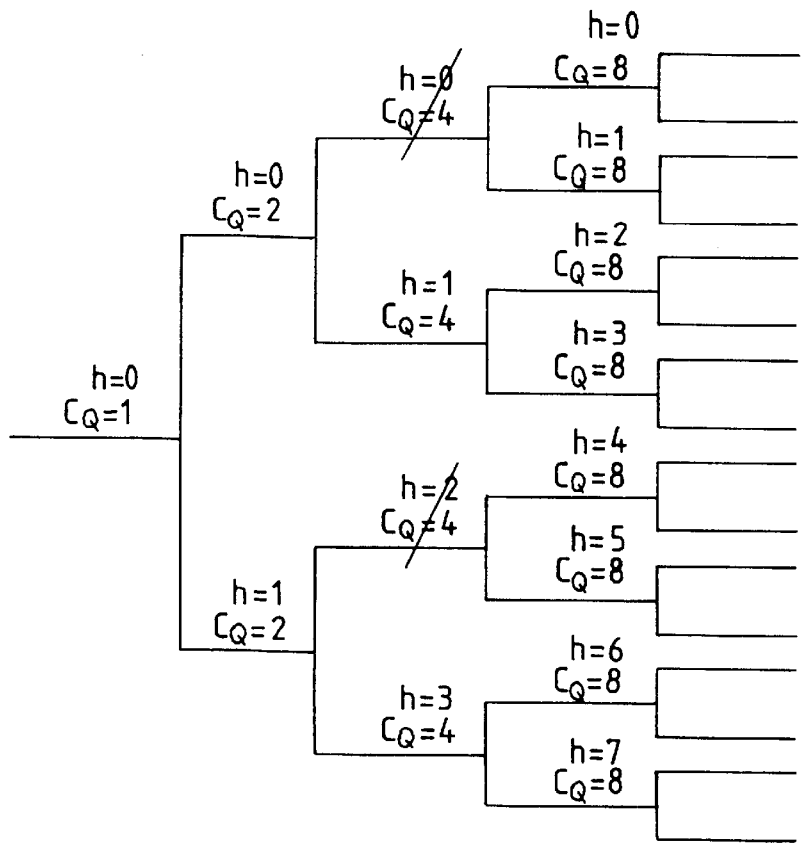
FIG_5
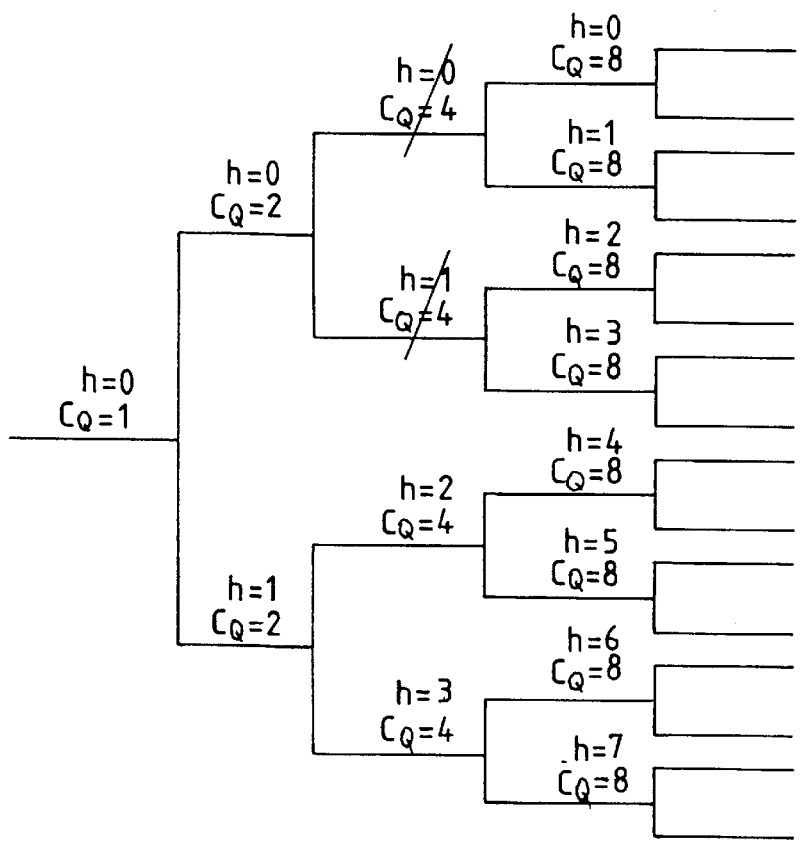
FIG_6

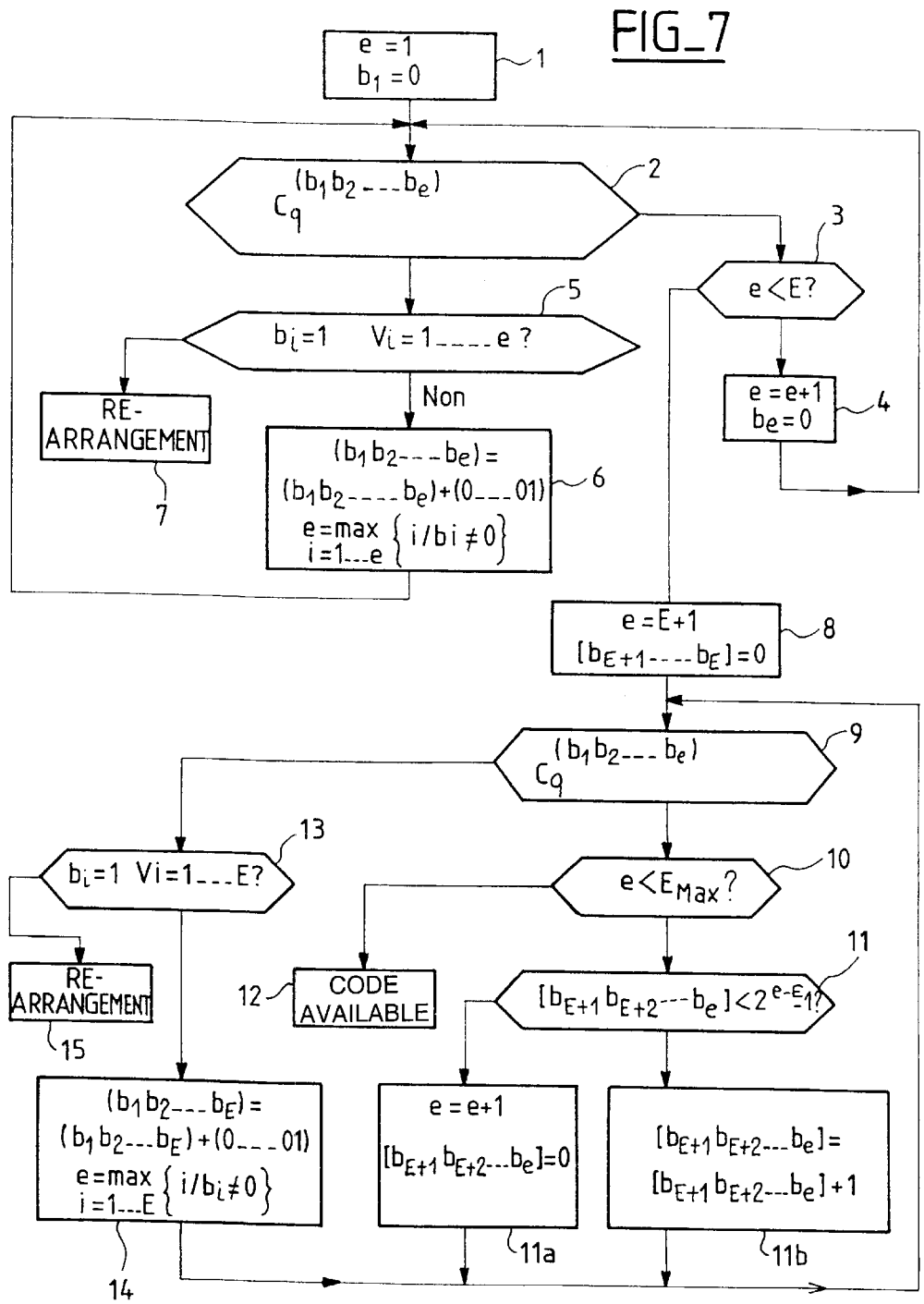

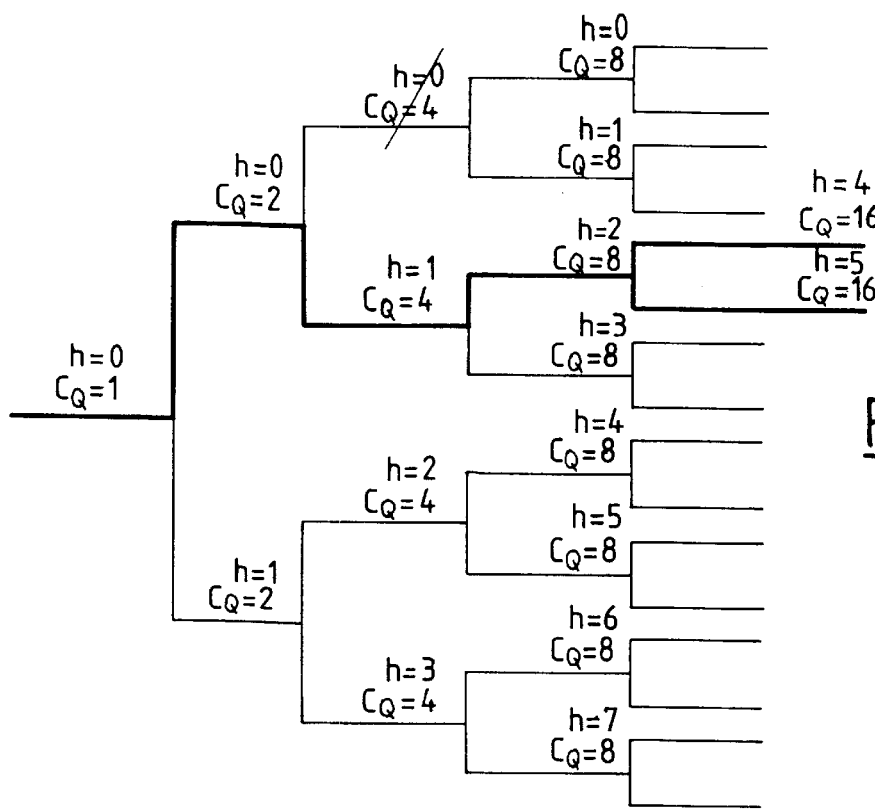
FIG_8
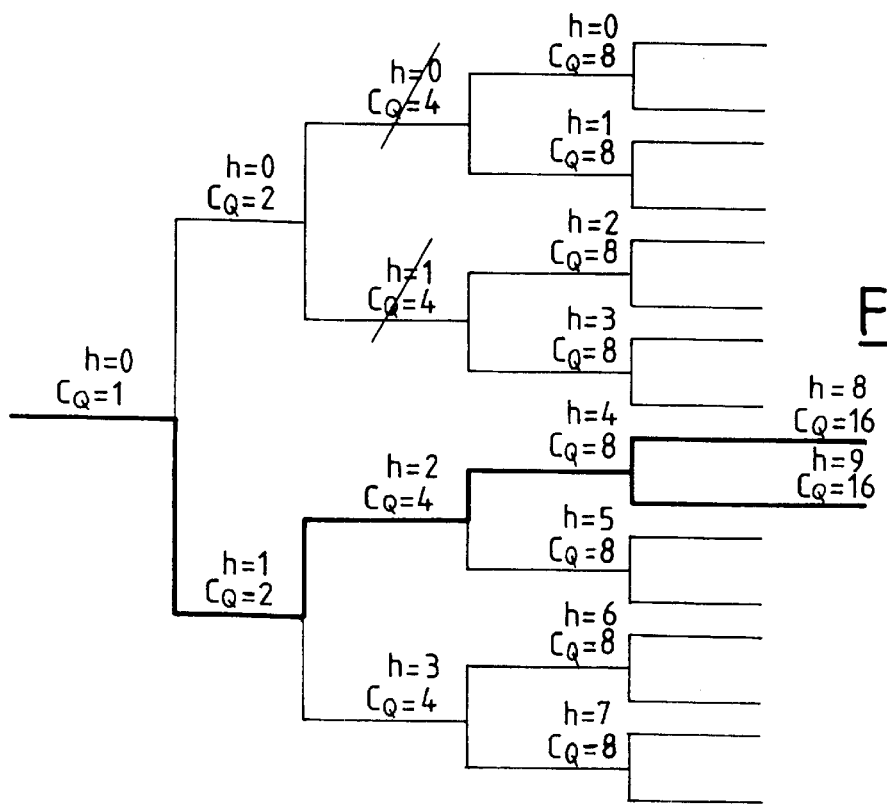
FIG_9

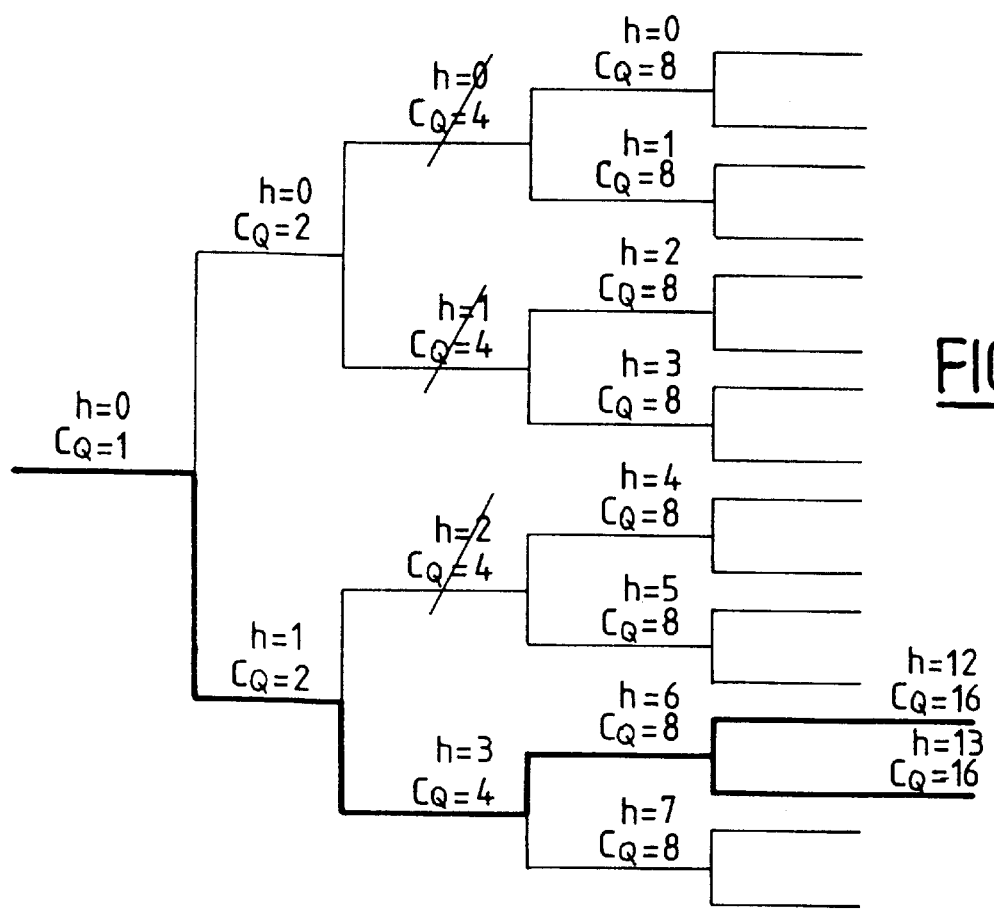
FIG_10

METHOD OF ALLOCATING ORTHOGONAL CODES IN A CODE DIVISION MULTIPLE ACCESS MOBILE RADIO SYSTEM USING CODES OF VARIABLE LENGTH

The present invention is generally concerned with spread spectrum communication systems, i.e. systems in which spectrum spreading is applied to a sequence of data to be transmitted, on transmission, using a spreading code, and, conversely, despreading is effected on reception, in order to find the original sequence.

BACKGROUND OF THE INVENTION

Spreading an incident data sequence of N symbols, denoted (d1, d2, . . . , dN), using a code of length (or spreading factor) Q, denoted $c_Q$=(c1, c2, . . , cQ), produces a sequence of length Q.N, which can be represented as follows:

(d1.c1, d1.c2, . . . , d1.cQ, d2.c1, d2.c2, . . . , dN.cQ)

where d1.c1 represents the multiplication of d1 by c1.

An alternative representation of the spread sequence of length Q.N is (d1.cQ, d2.$c_Q$, . . . cN.$c_Q$) where d1.$c_Q$ represents the product of the symbol d1 by the spreading code $c_Q$.

A more general approach to spreading consists in having a different spreading code for each symbol of the input sequence, in which case the resulting spread sequence can be expressed in the form: (d1.$c_Q^{(1)}$,d2.$c_Q^{(2)}$, . . . ,dN.$c_Q^{(N)}$), $c_Q^{(1)}$ being the spreading code associated with the symbol d1. All the spreading codes preferably have the same length Q so that the resulting spread sequence has the length Q.N.

FIG. 1 outlines the principle of spreading, Ts designating the basic period (or symbol period) of a non-spread sequence and Tc designating the basic period (or chip, period) of a spread sequence, Ts and Tc being related by the equation Ts=Q.Tc. In the figure dn and dn+1 correspond to two successive symbols of a non-spread incoming sequence and d'l and d'l+1 correspond to two successive basic symbols (or "chips") of the same spread symbol of the incoming sequence.

One benefit of the above systems is enabling a plurality of users to share the same frequency band by allocating different users different codes.

One important application is Code Division Multiple Access (CDMA) cellular mobile radio systems.

In the above systems, the codes are advantageously orthogonal two by two within a cell to reduce interference between users in that cell (interference between cells can also be reduced by other techniques known per se).

Mathematical tools have been developed for generating orthogonal codes. Walsh functions, which are known per se, generate orthogonal codes of length Q recursively from orthogonal codes of length Q/2, Q/4, etc. To be more precise, two orthogonal codes of length q are obtained from a code of length q/2 by juxtaposing with that code of length q/2, respectively that code, and the complementary code.

In systems using orthogonal codes of fixed length Q, the allocation of orthogonal codes can then be a relatively simple operation, consisting in selecting a code that is not being used at the time in question from Q possible orthogonal codes of length Q.

There is a need in these cellular mobile radio systems to be able to transmit data at a varying bit rate, in particular when the bit rate of the user itself varies (for example in the case of transmitting multimedia type data), or because, depending on the conditions for propagation of radio signals, a higher or lower degree of redundancy has to be introduced into the data to be transmitted in order to obtain a higher or lower degree of protection against transmission errors.

Increasing the bit rate of data to be transmitted by a user, for the same allocated frequency band (i.e. for the same duration Tc) by reducing the length of the code allocated to that user so that they continue to send on only one code is known per se. FIG. 2 shows the principle of a technique of this kind, and uses the same type of representation as FIG. 1, but for two different bit rates of the incoming sequence, respectively identified by the suffices 1 and 2, in this instance for three successive symbols dn, dn+1 and dn+2 of the incoming sequence, the symbol period corresponding to Ts1 for symbol dn and Ts2 for symbols dn+1 and dn+2 and the code length corresponding to Q1 for symbol dn and Q2 for symbols dn+1 and dn+2.

Mobile radio systems using codes of variable length, typically Walsh codes, of length Q, Q/2, Q/4, etc. are therefore known per se.

These codes can be represented in the form of a tree, each code giving rise within the tree to two codes of double the length, in the manner outlined above.

FIG. 3 shows a tree of the above kind in which the codes are denoted $c_Q^h$, where Q represents the length of the code and h represents the order of that code in the set of possible codes of length Q.

Accordingly, in FIG. 3, the various codes can be denoted as follows:

$c_{Q=1}^{h=0}$=(1)
$c_{Q=2}^{h=0}$(1,1)
$c_{Q=2}^{h=1}$(1,-1)
$c_{Q=4}^{h=0}$(1,1,1,1)
$c_{Q=4}^{h=1}$(1,1,-1,-1)
$c_{Q=4}^{h=2}$(1,-1,1,-1)
$c_{Q=4}^{h=3}$(1,-1,-1,1)
$c_{Q=8}^{h=0}$(1,1,1,1,1,1,1,1)
$c_{Q=8}^{h=1}$(1,1,1,1,-1,-1-1,-1)
$c_{Q=8}^{h=2}$(1,1,-1,-1,1,1,-1-1)
$c_{Q=8}^{h=3}$(1,1,-1,-1,-1,-1,1,1)
$c_{Q=8}^{h=4}$(1,-1,1,-1,1,-1,1,-1)
$c_{Q=8}^{h=5}$(1,-1,1,-1,1,-1,1,-1)
$c_{Q=8}^{h=6}$(1,-1,-1,1,1,-1,-1,1)
$c_{Q=8}^{h=7}$(1,-1,-1,1,-1,1,1,-1)

In a tree of the above kind the orthogonal relationship between codes of different length is preserved only on condition that certain allocation rules are complied with. Accordingly, a given code cannot be allocated at a given time if it is recursively tied to a code that has already been allocated.

Allocating orthogonal codes therefore constitutes a relatively more complex operation in systems using codes of variable length than in systems using codes of fixed length.

Thus document U.S. Pat. No. 5,751,761 teaches, on each new request for allocation of a code of given length, drawing up a list including codes already allocated at that time and codes tied to them in a recursive manner, the code to be allocated then being a chosen one of the codes not appearing in the list.

A solution of the above kind has the particular drawback that establishing a list of the above kind is a lengthy operation and entails multiple write operations, the number of which increases with the depth of the tree, i.e. with the maximum permitted code length.

OBJECTS AND SUMMARY OF THE INVENTION

A particular aim of the present invention is to avoid this drawback.

Thus in one aspect the present invention consists in a method of allocating orthogonal codes in a code division multiple access mobile radio system using codes of variable length which are generated in such a way that they can be represented in the form of a tree, said method essentially including, in response to a code allocation request, a first step of determining, in accordance with the tree capacity used, corresponding to codes already allocated, and the tree capacity required, corresponding to the code allocation requested, if such allocation is possible.

In accordance with another feature, if such allocation is found to be possible at the end of said first step said allocation method includes a second step of searching for a code to allocate.

In accordance with another feature, if such allocation is found to be possible at the end of said first step and if no code to be allocated has been found at the end of said second step said allocation method includes a third step of rearranging allocated codes within said tree.

Accordingly, in contrast to the document cited previously, it is not necessary, on each new allocation request, to draw up a complete list of all the codes that are not available, and in particular to look for all the codes tied in a recursive manner to codes already allocated. All that is required is to see if a code having the required length is available or can be made available by rearranging the codes allocated within the tree; if a code of this kind is available or can be rendered available by rearrangement in this way, the search for the code to be allocated is effected by searching for a code that is not already allocated and is not tied in a recursive manner to a code already allocated.

The allocation operation is therefore made less complex and speeded up, which leads to a simplification and an improvement in quality of service.

In contrast to systems using fixed length codes, here the concept of capacity takes account of the fact that allocating a given code when it is not only that code that is unavailable thereafter, but also all codes that are tied to it in a recursive manner within said tree; this is what is meant in the present context by the expression "tree capacity".

In another aspect the invention therefore consists in a particularly simple and fast method of determining a used or required tree capacity.

In accordance with another feature, the tree capacity used or required corresponding to a code of length Q is determined as corresponding to (1/Q)th of the total tree capacity.

In accordance with another feature, said first step advantageously includes comparing the sum S of the tree capacity used and of the tree capacity required to a capacity threshold T corresponding to a maximum capacity that can be allocated.

In accordance with another feature, said sum S is expressed in the form:

$$S = \left( \sum_{q=1}^{Q_{Max}} \frac{N_q}{q} \right) + \frac{1}{Q}$$

where $N_q$ is the number of codes already allocated of length q between 1 and $Q_{Max}$ ($Q_{Max}$ being maximum code length permitted) and Q is the length of the code whose allocation is requested (this sum can be limited to a subset of the integers q between 1 and $Q_{Max}$, for example the integers of the set that are a power of 2).

Accordingly, said first step of determining if a requested allocation is possible can be effected in a particularly simple and fast manner.

Said threshold can advantageously be determined in an adaptive manner in accordance with various parameters characteristic of the system concerned.

Such parameters can include in particular the measured or estimated level of interference in a cell, the type of call (circuit-switched or packet-switched) in that cell, the required quality of service, etc.

It may be possible to choose said threshold in such a manner that the maximum capacity of said tree is never reached, in particular in accordance with features specific to CDMA type cellular systems, in terms of limiting the acceptable number of users (in particular according to the maximum interference level between cells and of power control stability).

In accordance with another feature, allocation of certain codes and their sub-trees is prohibited and said threshold is then expressed in the form:

$$T \leq T_{Max}$$

with:

$$T_{Max} = 1 - \frac{\text{number of prohibited codes of length } Q_{Max}}{Q_{Max}}$$

where $Q_{Max}$ is the maximum code length permitted.

In accordance with another feature, said second step of searching for a code to allocate of given length includes:

a first sub-step of searching for a free path within said tree, from the root of the tree as far as a code having said given length; this free path must not include any other code already allocated, and a second sub-step for verifying if no code has already been allocated in the sub-tree whose root is the code found at the end of said first sub-step.

A code being identified within said tree by its code length and by the order of that code in the set of different codes having that code length, said first and second sub-steps advantageously include scanning all or part of said tree in accordance with a combination of increasing code lengths and orders varying in accordance with a predetermined law, in particular an increasing law.

Said first and second sub-steps advantageously use binary numbering of said orders.

The present invention also has for its object an entity for a mobile radiocommunication system, comprising means for performing a method of the above kind.

BRIEF DESCRIPTION OF THE DRAWINGS

Other aims and features of the present invention will become apparent on reading the following description of one embodiment given with reference to the accompanying drawings, in which:

FIG. 1 outlines the principle of spectrum spreading, in the case of fixed length spreading codes, FIG. 2 outlines the principle of spectrum spreading, in the case of variable length spreading codes, FIG. 3 shows how variable length codes are represented in the form of a tree, FIG. 4 shows a code allocation method in accordance with the invention, FIG. 5 shows an example of codes allocated, before said step of rearranging allocated codes within said tree, FIG. 6 shows an example of codes allocated, after said step of rearranging allocated codes within said tree, FIG. 7 shows one embodiment of said step of searching for a code to allocate, FIG. 8 shows a first example of the code searching step from FIG. 7, FIG. 9 shows a second example of the code searching step from FIG. 7, FIG. 10 shows a third example of the code searching step from FIG. 7.

MORE DETAILED DESCRIPTION

In accordance with the invention, as shown in FIG. 4, in response to a request to allocate a code of given length, denoted A, in a first step 20, whether such allocation is possible or not is determined in accordance with the tree capacity used, denoted Cu, corresponding to codes already allocated, and the tree capacity required, denoted Cr, corresponding to the requested code allocation.

If such allocation is possible, a code to be allocated is searched for in a second step 21.

If such allocation is not possible, no code can be allocated at the time in question; the allocation request can possibly be repeated later (which is shown in dashed line in the figure).

If such allocation is possible and a code is found at the end of said search, then that code constitutes the allocated code.

If such allocation is possible and no code to allocate is found at the end of said search, the allocated codes are rearranged within said tree in step 22 before proceeding to a new search for a code to allocate in step 21.

Step 20 advantageously corresponds to comparing the sum S of Cu+Cr to a threshold T corresponding to a maximum capacity that can be allocated.

The value S is advantageously expressed in the form:

$$S = \left(\sum_{q=1}^{Q_{Max}} \frac{N_q}{q}\right) + \frac{1}{Q}$$

where $N_q$ is the number of codes already allocated of length 8 between 1 and $Q_{Max}$ ($Q_{Max}$ being the maximum code length permitted) and Q is the code length in respect of which allocation is requested.

For example, if only one code has already been allocated, of length 4, and if allocation of a code of length 8 is requested, we get:

$S=\frac{1}{4}+\frac{1}{8}$ or:

$S=\frac{3}{8}$.

If the threshold value T is chosen as 1, for example, then because the value S is lower than the threshold value T a code of length Q equal to a can be allocated.

For example, if two codes of length 4 have already been allocated, and if allocation of a code of length 8 is requested, we get:

$S=\frac{1}{4}+\frac{1}{4}+\frac{1}{8}$ or $S=\frac{5}{8}$.

Similarly, if the threshold value is equal to 1, a code of length 8 can be allocated.

For example, if three codes of length 4 have already been allocated, and if allocation of a code of length 8 is requested, we get:

$S=\frac{1}{4}+\frac{1}{4}+\frac{1}{4}+\frac{1}{8}$ or:

$S=\frac{7}{8}$.

Similarly, if the threshold value is equal to 1, a code of length 8 can be allocated.

In contrast, if a code of length 2 and two codes of length 4 have already been allocated, for example, and if allocation of a code of length 8 is requested, we get:

$S=\frac{1}{2}+\frac{1}{4}+\frac{1}{4}+\frac{1}{8}$ or:

$S=\frac{9}{8}$.

Because the value S is greater than the threshold value T in this case, the allocation request cannot be satisfied.

As previously indicated, the threshold value T could also be chosen less than 1, in particular to allow for features specific to CDMA type cellular systems.

Also as previously indicated, the threshold value T could also be adaptive in accordance with various parameters characteristic of the system concerned.

FIG. 5 shows an example of codes already allocated, before said step of rearranging the allocated codes within said tree is executed. For example, the codes $c_{Q=4}^{h=0}$ and $c_{Q=8}^{h=2}$ have already been allocated, for which reason they are struck through in the figure.

In this case, although in response to a request for allocation of a code of length 2 said first step indicates that such allocation is possible, no code can be found at the end of said second step of searching for a code to be allocated.

FIG. 6 shows an example of codes already allocated after said step of rearranging the allocated codes within said tree has been executed. For example, the codes already allocated are now the codes $c_{Q=4}^{h=0}$ and $c_{Q=4}^{-1}$, for which reason these codes are struck through in the figure.

In this case, in response to a request to allocate a code of length 2, said first step indicates that such allocation is possible and a code can be found at the end of said second step of searching for a code to allocate.

An advantageous method of searching for a code of given length to be allocated will now be described with reference to FIG. 7.

In this method, said search includes the following steps:
- a first sub-step of searching for a free path within said tree, from the root of the tree to a code having said given length; this free path must not include any other code already allocated, and
- a second sub-step for verifying if no other code has already been allocated in the sub-tree whose root is the code found at the end of said first sub-step.

A code $c_q^h$ can be identified within said tree by its length q and its order h among all possible codes of length q.

In the following description a binary representation is used for the variable h, thus:

$h=(b_1 b_2 \ldots b_e)$ where $q=2^e$, $q \leq Q_{Max}$ and $\leq E_{Max}$ is such that $Q_{Max}=2^{Emax}$.

Q (with $Q=2^E$) is the code length to be allocated.

As shown in FIG. 7, a search of the above kind advantageously includes the following steps:

Step 1 of initializing variables e (or q) and $b_1$:
  e=1 (i.e. q=2), and $b_1=0$.
Step 2 during which it is determined if the code $c_q^{(b_1b_2\ldots b^e)}$ is used.
  If the code $c_q^{(b_1b_2b_e)}$ is found not to have been used at the end of step 2:
Step 3 during which it is determined if e is less than E.
  If e is found to be less than E at the end of step 3:
Step 4 during which e is incremented by 1 and the value be is set to 0.
Return to step 2.
If is not less than E at the end of step 3 (i.e. if e=E):
  Initialization step 8:
    e=E+1 and $[b_{E+1} b_{E+2} \ldots b_e]=0$
  Step 9 during which it is determined if $c_q^{(b_1b_2\ldots b_e)}$ has been used.
If $c_q^{(b_1b_2\ldots b_e)}$ is found not to have been used at the end of step 9:
  Step 10 during which it is determined if $e<E_{Max}$
If e is less than $E_{Max}$, at the end of step 10:
  Step 11 during which it is determined if $[b_{E+1} b_{E+2} \ldots b_e]$ is less than $2^{e-E}-1$
  If $[(b_{E+1} b_{E+2} \ldots b_E]$ is less than $2^{e-E}-1$,
    step 11b during which:
      If $[(b_{E+1} b_{E+2} \ldots b_e]=[b_{E+1} b_{E+2} \ldots b_e]+1$
      If $[b_{E+1} b_{E+2} \ldots b_e]$ is found to be equal to $2^{e-E}-1$,
      step 11a during which e is incremented by 1 and $[b_{E+1} b_{E+2} \ldots b_e]$ is reset to 0.
    Return to step 9.
  if e is not less than $E_{Max}$, (i.e. if $e=E_{Max}$), at the end of step 10:
    an available code has been found (step 12).
If code $c_q^{b_1b_2b_e}$ is found to have been used at the end of step 9:
  Step 13 consisting in determining if $b_i=1 \forall=1,\ldots,E$.
If $\exists i \in \{1,\ldots E\}$ such that $b_1 \neq 1$ at the end of step 13:
  Step 14 consisting in
    $(b_1 b_2 \ldots b_E)=(b_1 b_2 \ldots b_E)+(0 \ldots 01)$
      then setting e to the maximum value of i for which $b_i \neq 0$ (with i between 1 and E).
  Return to step 9.
If $b_1=1 \forall=1,\ldots,E$ at the end of step 13:
Rearrangement of codes is necessary within the tree (step 15).
If code $c_q^{(b_1b_2b_e)}$ is found to have been used at the end of step 2:
  Step 5 during which it is determined if $b_i=1 \forall=1,\ldots,e$.
If $b_i \neq 1 \forall i=1,\ldots,e$ at the end of step 5:
  step 6 during which:
    $(b_1 b_2 \ldots b_e)=(b_1 b_2 \ldots b_e)+(0 \ldots 01)$
      then e is set to the maximum value of i for which $b_i \neq 0$ (with i between 1 and e).
  Return to step 2.
If $\exists i \in \{1,\ldots,E\}$ such that $b_i \neq 1$ at the end of step 5:
  Rearrangement of codes within said tree is necessary (step 7).

Thus steps 1 to 6 constitute a first sub-step of searching for a free path within said tree, from the root of the tree to a code having said given length. Steps 8 to 14 constitute said second sub-step for verifying if no other code has already been allocated in the sub-tree whose root is the code found at the end of said first sub-step.

FIG. 8 shows a first embodiment of a method of search for a code to allocate of the above kind.

This example corresponds to the situation in which a code of length 4 has already been allocated, for example the code $c_{Q=4}^{h=0}$ (for which reason this code is struck through in the figure) and a code of length Q equal to 8 is to be allocated.

In this case the codes envisaged successively during said free path search are as follows:

$c_{Q=2}^{h=0}$ (not used), $c_{Q=4}^{h=0}$ (used), $c_{Q=4}^{h=1}$ (not used), $c_{Q=8}^{h=2}$ (not used).

In FIG. 8 thicker lines are used to show the free path found within said tree, from the root $c_{Q=1}^{h=0}$ and in this instance as far as the code $c_{Q=8}^{h=2}$, this free path here passing through the codes $c_{Q=2}^{h=0}$ and $c_{Q=4}^{h=1}$.

FIG. 8 also shows in thicker line the sub-tree whose root is the code $c_{Q=8}^{h=2}$ and formed of the codes $c_{Q=16}^{h=4}$ and $c_{Q=16}^{h=5}$. In this instance, no code having already been allocated in this sub-tree, the code $c_{Q=8}^{h=2}$ can be allocated.

FIG. 9 shows a second example. In this second example the codes $c_{Q=4}^{h=0}$ and $c_{Q=4}^{h=1}$ have already been allocated (for which reason these codes are struck through in the figure) and the allocation of a code of length 8 has been requested.

In this case the codes that are successively considered during said free path search are as follows:

$c_{Q=2}^{h=0}$ (not used), $c_{Q=4}^{h=0}$ (used), $c_{Q=4}^{h=1}$ (used), $c_{Q=2}^{h=1}$ (not used), $c_{Q=4}^{h=2}$ (not used), $c_{Q=8}^{h=4}$ (not used).

FIG. 9 also shows in thicker line the free path found within said tree, from the root $c_{Q=1}^{h=0}$ and in this instance as far as the code $c_{Q=1}^{h=0}$ this tree path here passing through the codes $c_{Q=2}^{h=1}$ and $c_{Q=4}^{h=2}$.

FIG. 9 also shows in thicker line the sub-tree whose root is the code $c_{Q=8}^{h=4}$ and formed of the codes $c_{Q=16}^{h=8}$ and $c_{Q=16}^{h=9}$. In this instance, no code having been already allocated in this sub-tree, the code $c_{Q=8}^{h=4}$ can be allocated.

FIG. 10 shows a third example. In this third example the codes $c_{Q=4}^{h=0}$, $c_{Q=4}^{h=1}$ and $c_{Q=4}^{h=2}$ have already been allocated (for which reason these codes are struck through in the figure) and the allocation of a code of length 8 has been requested.

In this case the various codes that are successively considered during said free path search are as follows:

$c_{Q=2}^{h=0}$ (not used), $c_{Q=4}^{h=0}$ (used), $c_{Q=4}^{h=1}$ (used), $c_{Q=2}^{h=1}$ (not used), $c_{Q=4}^{h=2}$ (used), $c_{Q=4}^{h=3}$ (not used), $c_{Q=8}^{h=6}$ (not used).

FIG. 10 also shows in thicker line the free path found within said tree, from the root $c_{Q=1}^{h=0}$ and in this instance as far as the code $c_{Q=8}^{h=6}$, this free path passing here through the codes $c_{Q=2}^{h=1}$ and $c_{Q=4}^{h=3}$.

FIG. 10 also shows in thicker line the sub-tree whose root is the code $c_{Q=8}^{h=6}$ and formed of the codes $c_{Q=16}^{h=12}$ et $c_{Q=16}^{h=13}$. In this instance, no code having already been allocated in this sub-tree, the code $c_{Q=8}^{h=6}$ can be allocated.

Note also that the binary numbering scheme used to identify the codes within the tree by their order h enables methodical scanning of the tree during said free path search, using a combination of increasing code lengths and increasing orders (although said orders could be considered in accordance with a law other than an increasing law, for example a decreasing law). Apart from the fact that this algorithm can therefore be implemented in a relatively simple manner, this also enables methodical allocation of the codes, which avoids problems of excessively fast saturation of capacity that could result from allocation effected in a more random manner.

Another advantage is that using the criterion S (i.e. the first step) enables a priori determination if it is possible to find a code of required length. If the response to the test is in the negative, it is possible to reject the request without having to scan the tree at all. Otherwise scanning the tree finds an available code, if necessary after rearrangement if the first pass is unsuccessful.

The approach adopted in the document previously mentioned (U.S. Pat. No. 5,751,761) did not satisfy this requirement: in the absence of any availability criterion, the search for non-available codes indicated an impossibility, but it was impossible to know if rearrangement would free up a code, whence a longer procedure, with the risk of ultimate failure.

It is also possible to prohibit the allocation of certain codes and their sub-trees, for example half of the codes for which $b_i=1$, using the above notation. In this case the threshold T used must be adapted accordingly: its value is at most that of the maximal capacity that can be allocated, with the new constraint $$T_{Max} = 1 - \frac{\text{number of prohibited codes of length } Q_{Max}}{Q_{Max}};$$

and T can be smaller than $T_{max}$.

What is claimed is:

1. A method of allocating orthogonal codes in response to a code allocation request in a code division multiple access mobile radio system using codes of variable length which are generated in such a way that the codes can be represented in the form of a tree, said method comprising:

a first step of determining a tree capacity used corresponding, to codes already allocated, determining a tree capacity required corresponding to the code allocation request, and determining whether a code allocation is possible based on the tree capacity used and the tree capacity required; and a second step of searching for a code to allocate when said code allocation is determined to be possible in said first step.

2. An entity for a mobile radiocommunication system, comprising means for performing a method according to claim 1.

3. The method according to claim 2, further comprising a third step of rearranging allocated codes within said tree if said code allocation is determined to be possible in said first step and if said code to allocate is not found in said second step.

4. The method according to claim 1, wherein the tree capacity used or the tree capacity required corresponding to a code of length Q is determined as corresponding to (1/Q)th of a total tree capacity.

5. The method according to claim 1, wherein said first step includes comparing a sum S of the tree capacity used Cu and of the tree capacity required Cr to a capacity threshold T corresponding to a maximum capacity that can be allocated.

6. The method according to claim 4, wherein said first step includes comparing a sum S of the tree capacity used Cu and of the tree capacity required Cr to a capacity threshold T corresponding to a maximum capacity that can be allocated, and wherein said sum S is expressed in the form:

$$S = \left(\sum_{q=1}^{Q_{Max}} \frac{N_q}{q}\right) + \frac{1}{Q}$$

where $N_q$ is the number of codes already allocated of length q between 1, $Q_{Max}$ being maximum code length permitted, and Q is the length of the code whose allocation is requested.

7. The method according to claim 5, wherein said threshold is made adaptive in accordance with various parameters characteristic of said system.

8. The method according to claim 5, wherein said threshold is chosen so that the maximum capacity of said tree is never reached.

9. The method according to claim 5, wherein the allocation of certain codes and their sub-trees is prohibited, and wherein said threshold is then expressed in the form:

$T \leq T_{Max}$ with:

$$T_{Max} = 1 - \frac{\text{number of prohibited codes of length } Q_{Max}}{Q_{Max}}$$

where $Q_{Max}$ is the maximum code length permitted.

10. The method according to claim 1, wherein said second step of searching for a code of given length to allocate comprises:

a first sub-step of searching for a free path within said tree, from the root of the tree as far as a code having said given length, wherein the free path does not include any other code already allocated, and a second sub-step for verifying whether no code has already been allocated in the sub-tree whose root is the code found in said first sub-step.

11. The method according to claim 10, wherein, a code $c_Q^h$ being identified within said tree by its code length Q and by the order h of that code in the set of different codes having that code length, said first and second sub-steps include scanning all or part of said tree in accordance with a combination of increasing code lengths Q and orders h varying in accordance with a predetermined increasing law.

12. The method according to claim 11, wherein said first and second sub-steps use binary numbering of said orders h.

* * * * *